US008271606B2

(12) United States Patent
Jewett et al.

(10) Patent No.: US 8,271,606 B2
(45) Date of Patent: *Sep. 18, 2012

(54) NETWORK-BASED STORAGE SYSTEM CAPABLE OF ALLOCATING STORAGE PARTITIONS TO HOSTS

(75) Inventors: Douglas E. Jewett, Round Rock, TX (US); Adam J. Radford, Mission Viejo, CA (US); Bradley D. Strand, Los Gatos, CA (US); Jeffrey D. Chung, Cupertino, CA (US); Joel D. Jacobson, Mountain View, CA (US); Robert B. Haigler, Newark, CA (US); Rod S. Thompson, Sunnyvale, CA (US); Thomas L. Couch, Woodside, CA (US)

(73) Assignee: Summit Data Systems LLC, Frisco, TX (US)

( * ) Notice: Subject to any disclaimer, the term of this patent is extended or adjusted under 35 U.S.C. 154(b) by 401 days.

This patent is subject to a terminal disclaimer.

(21) Appl. No.: 12/195,211

(22) Filed: Aug. 20, 2008

(65) Prior Publication Data

US 2008/0313301 A1    Dec. 18, 2008

Related U.S. Application Data

(60) Division of application No. 11/683,944, filed on Mar. 8, 2007, now Pat. No. 7,428,581, which is a continuation of application No. 09/927,894, filed on Aug. 10, 2001, now Pat. No. 7,392,291.

(60) Provisional application No. 60/244,664, filed on Aug. 11, 2000.

(51) Int. Cl.
*G06F 15/167* (2006.01)
*G06F 13/00* (2006.01)

(52) U.S. Cl. .......... 709/214; 709/215; 711/114
(58) Field of Classification Search .......... 709/223–231, 709/212–217, 239; 711/114
See application file for complete search history.

(56) References Cited

U.S. PATENT DOCUMENTS

| 5,127,097 | A |   | 6/1992 | Mizuta |
| 5,129,077 | A | * | 7/1992 | Hillis .............. 712/13 |
| 5,485,627 | A | * | 1/1996 | Hillis .............. 712/13 |
| 5,548,770 | A | * | 8/1996 | Bridges ............ 1/1 |
| 5,628,005 | A | * | 5/1997 | Hurvig ............. 1/1 |
| 5,712,975 | A | * | 1/1998 | Ooe ............ 709/219 |
| 5,721,779 | A | * | 2/1998 | Funk ............ 713/155 |
| 5,754,830 | A |   | 5/1998 | Butts et al. |
| 5,787,463 | A |   | 7/1998 | Gajjar |

(Continued)

OTHER PUBLICATIONS

Carlson, M., S., Merhar, M., Monia, C., Rajagopal, M., "A Framework for IP Based Storage," Internet Draft Document printed from ietf.org web site, Nov. 17, 2000, pp. 1-36 (of-record in parent and/or grandparent application).

(Continued)

*Primary Examiner* — Ario Etienne
*Assistant Examiner* — Sargon Nano
(74) *Attorney, Agent, or Firm* — Greenblum & Bernstein, P.L.C.

(57) ABSTRACT

A network-based storage system comprises one or more block-level storage servers that connect to, and provide disk storage for, one or more host computers. In one embodiment, the system is capable of subdividing the storage space of an array of disk drives into multiple storage partitions, and allocating the partitions to host computers on a network. A storage partition allocated to a particular host computer may appear as local disk drive storage to user-level processes running on the host computer.

16 Claims, 9 Drawing Sheets

U.S. PATENT DOCUMENTS

| | | | | |
|---|---|---|---|---|
| 5,809,279 | A | * | 9/1998 | Oeda et al. ..................... 711/153 |
| 5,867,491 | A | | 2/1999 | Derango et al. |
| 5,867,723 | A | * | 2/1999 | Chin et al. ....................... 712/11 |
| 5,907,621 | A | | 5/1999 | Bachman |
| 5,931,918 | A | | 8/1999 | Row et al. |
| 5,931,947 | A | | 8/1999 | Burns et al. |
| 5,974,532 | A | | 10/1999 | McLain et al. |
| 5,996,014 | A | | 11/1999 | Uchihori et al. |
| 6,003,045 | A | * | 12/1999 | Freitas et al. ......................... 1/1 |
| 6,076,142 | A | | 6/2000 | Corrington et al. |
| 6,098,114 | A | | 8/2000 | McDonald et al. |
| 6,137,796 | A | | 10/2000 | Derango et al. |
| 6,151,297 | A | * | 11/2000 | Congdon et al. .............. 370/216 |
| 6,161,165 | A | | 12/2000 | Solomon et al. |
| 6,185,316 | B1 | | 2/2001 | Buffam |
| 6,339,785 | B1 | | 1/2002 | Feigenbaum |
| 6,378,036 | B2 | * | 4/2002 | Lerman et al. ................ 711/112 |
| 6,393,026 | B1 | | 5/2002 | Irwin |
| 6,421,711 | B1 | | 7/2002 | Blumenau et al. |
| 6,421,753 | B1 | * | 7/2002 | Hoese et al. ................... 710/315 |
| 6,487,581 | B1 | | 11/2002 | Spence et al. |
| 6,502,205 | B1 | * | 12/2002 | Yanai et al. ......................... 714/7 |
| 6,529,994 | B1 | * | 3/2003 | Bleidt et al. ................... 711/114 |
| 6,539,482 | B1 | | 3/2003 | Blanco et al. |
| 6,564,252 | B1 | | 5/2003 | Hickman et al. |
| 6,618,757 | B1 | | 9/2003 | Babbitt et al. |
| 6,618,798 | B1 | | 9/2003 | Burton et al. |
| 6,633,909 | B1 | * | 10/2003 | Barrett et al. ................. 709/224 |
| 6,654,752 | B2 | * | 11/2003 | Ofek ...................................... 1/1 |
| 6,662,268 | B1 | * | 12/2003 | McBrearty et al. ........... 711/114 |
| 6,671,776 | B1 | | 12/2003 | DeKoning |
| 6,714,968 | B1 | | 3/2004 | Prust |
| 6,725,456 | B1 | * | 4/2004 | Bruno et al. ................... 718/102 |
| 6,772,347 | B1 | | 8/2004 | Xie et al. |
| 6,807,559 | B1 | * | 10/2004 | Budhiraja ...................... 709/203 |
| 6,834,326 | B1 | * | 12/2004 | Wang et al. .................... 711/114 |
| 6,912,668 | B1 | * | 6/2005 | Brown et al. ....................... 714/6 |
| 6,955,956 | B2 | | 10/2005 | Tanaka et al. |
| 6,970,869 | B1 | | 11/2005 | Slaughter et al. |
| 6,983,330 | B1 | * | 1/2006 | Oliveira et al. ............... 709/239 |
| 7,392,291 | B2 | | 6/2008 | Jewett et al. |
| 7,428,581 | B2 | | 9/2008 | Jewett et al. |
| 7,543,184 | B2 | * | 6/2009 | Dean et al. ....................... 714/32 |
| 2001/0044863 | A1 | * | 11/2001 | Oeda et al. .................... 710/104 |
| 2002/0059539 | A1 | * | 5/2002 | Anderson .......................... 714/6 |
| 2002/0077177 | A1 | * | 6/2002 | Elliott .............................. 463/40 |
| 2002/0104041 | A1 | * | 8/2002 | Jibbe ............................... 714/37 |
| 2003/0097504 | A1 | * | 5/2003 | Oeda et al. .................... 710/104 |
| 2003/0188059 | A1 | * | 10/2003 | Zack ............................... 710/74 |
| 2004/0230698 | A1 | * | 11/2004 | Oeda et al. .................... 709/245 |
| 2008/0313187 | A1 | | 12/2008 | Jewett et al. |

OTHER PUBLICATIONS

Gibson, G., Nagle, D., Amini, K., Chang, F., Feinberg, E., Gobioff, H., Lee, C., Ozceri, B., Riedel, E., and Rochberg, D., "A Case for Network-Attached Secure Disks," Technical Report, CMU-CS-96-142, Department of Electrical and Computer Engineering, Carnegie-Mellon University, Sep. 26, 1996, pp. 1-19 (of-record in parent and/or grandparent application).

Hotz, S., Van Meter, R., and Finn, G., "Internet Protocols for Network-Attached Peripherals," Proc. Sixth NASA Goddard Conference on Mass Storage Systems and Technologies in cooperation with Fifteenth IEEE Symposium on Mass Storage Systems, Mar. 1998, pp. 1-15 (of-record in parent and/or grandparent application).

Lee, E., and Thekkath, C., "Petal: Distributed Virtual Disks," ACM Seventh International Conference on Architectural Support for Programming Languages and Operating Systems, ACM Digital Library, Oct. 1996, pp. 84-92 (of-record in parent and/or grandparent application).

Perkins, C., and Harjono, H., "Resource Discovery Protocol for Mobile Computing," Mobile Networks and Applications, vol. 1, Issue 4, 1996, pp. 447-455 (of-record in parent and/or grandparent application).

Tiemey, B., Johnston, W., Herzog, H., Hoo, Guojun, J., Lee, J., Chen, L., and Rotem, D., "Distributed Parallel Data Storage Systems: A Scalable Approach to High Speed Image Servers," Proceedings of the Second ACM International Conference on Mulitmedia, Oct. 1994, pp. 399-405 (of-record in parent and/or grandparent application).

Van Meter, R., Finn, G., and Hotz, S., "VISA: Netstation's Virtual Internet SCSI Adapter," Proceedings of the Eighth International Conference on Architectural Support for Programming Languages and Operating Systems, Oct. 1998, pp. 71-80 (of-record in parent and/or grandparent application).

Complaint *filed in Summit Data Systems, L.L.C.*, v. *Adaptec, Inc. et al.*, filed Sep. 1, 2010 in the United States District Court for the District of Delaware, Case No. 1:10-cv-00749-UNA.

International Search Report in International Appl. No. PCT/US01/25256, mailing date of Dec. 14, 2001.

Office Action in U.S. Appl. No. 12/195,244, mailing date of Dec. 27, 2010.

Office Action in U.S. Appl. No. 12/195,244, mailing date of Oct. 11, 2011.

"Final Joint Claim Chart," dated Oct. 3, 2011, *filed in Summit Data Systems, LLC* v. *EMC Corp. et al.*, Civil Action No. 1:10-cv-00749-GMS (D. Del. 2010).

"Defendants' Opening Claim Construction Brief" including Tabs A-B, dated Oct. 26, 2011, *filed in Summit Data Systems, LLC* v. *EMC Corp. et al.*, Civil Action No. 1:10-cv-00749-GMS (D. Del. 2010).

"Declaration of Todd M. Simpson in Support of Defendant's Opening Claim Construction Brief," dated Oct. 26, 2011, *filed in Summit Data Systems, LLC* v. *EMC Corp. et al.*, Civil Action No. 1:10-cv-00749-GMS (D. Del. 2010).

Microsoft Computer Dictionary, Microsoft Press, Fourth Edition, pp. 115, 285, 290, and 359, copyright 1999, *cited as* Exhibit 1 in "Declaration of Todd M. Simpson in Support of Defendant's Opening Claim Construction Brief," *filed in Summit Data Systems, LLC* v. *EMC Corp. et al.*, Civil Action No. 1:10-cv-00749-GMS (D. Del. 2010), dated Oct. 26, 2011).

The Authoritative Dictionary of IEEE Standards Terms, Standards Information Network IEEE Press, Seventh Edition, pp. 52 and 107, copyright 2000 *cited as* Exhibit 2 in "Declaration of Todd M. Simpson in Support of Defendant's Opening Claim Construction Brief," *filed in Summit Data Systems, LLC* v. *EMC Corp. et al.*, Civil Action No. 1:10-cv-00749-GMS (D. Del. 2010), dated Oct. 26, 2011).

Pfaffenberger, Bryan, Webster's New World Dictionary of Computer Terms, Macmillan Publishing, Seventh Edition, pp. 160 and 169, copyright 2000 *cited as* Exhibit 3 in "Declaration of Todd M. Simpson in Support of Defendant's Opening Claim Construction Brief," *filed in Summit Data Systems, LLC* v. *EMC Corp. et al.*, Civil Action No. 1:10-cv-00749-GMS (D. Del. 2010), dated Oct. 26, 2011).

Merriam-Webster's Collegiate Dictionary, Merriam-Webster, Inc., Tenth Edition, pp. 239, 840, and 894, copyright 2000 *cited as* Exhibit 4 in "Declaration of Todd M. Simpson in Support of Defendant's Opening Claim Construction Brief," *filed in Summit Data Systems, LLC* v. *EMC Corp. et al.*, Civil Action No. 1:10-cv-00749-GMS (D. Del. 2010), dated Oct. 26, 2011).

Margolis, Philip E., Random House Webster's Computer & Internet Dictionary, Random House, Third Edition, p. 516, copyright 1999 *cited as* Exhibit 5 in "Declaration of Todd M. Simpson in Support of Defendant's Opening Claim Construction Brief," *filed in Summit Data Systems, LLC* v. *EMC Corp. et al.*, Civil Action No. 1:10-cv-00749-GMS (D. Del. 2010), dated Oct. 26, 2011).

"Plaintiff Summit Data Systems LLC's Memorandum of Law in Support of its Proposed Claim Construction," including Exhibits 1 and 2, dated Oct. 26, 2011, *filed in Summit Data Systems, LLC* v. *EMC Corp. et al.*, Civil Action No. 1:10-cv00749-GMS (D. Del. 2010).

"Declaration of Myron Zimmerman in Support of Plaintiff Summit Data Solutions LLC's Proposed Claim Constructions," dated Oct. 26, 2011, *cited as* Exhibit 3 in "Plaintiff Summit Data Systems LLC's Memorandum of Law in Support of its Proposed Claim Construction," *filed in Summit Data Systems, LLC* v. *EMC Corp. et al.*, Civil Action No. 1:10-cv-00749-GMS (D. Del. 2010), dated Oct. 26, 2011).

"Defendants' Answering Claim Construction Brief," including Tab A, dated Nov. 21, 2011, *filed in Summit Data Systems, LLC v. EMC Corp. et al.*, Civil Action No. 1:10-cv-00749-GMS (D. Del. 2010).

"Plaintiff Summit Data Systems LLC's Answering Memorandum of Law in Support of its Proposed Claim Constructions," dated Nov. 21, 2011, *filed in Summit Data Systems, LLC v. EMC Corp. et al.*, Civil Action No. 1:10-cv-00749-GMS (D. Del. 2010).

"Joint Appendix of Intrinsic Evidence," dated Nov. 21, 2011, *filed in Summit Data Systems, LLC v. EMC Corp. et al.*, Civil Action No. 1:10-cv-00749-GMS (D. Del. 2010).

Office Action dated Jun. 7, 2012 issued with respect to U.S. Appl. No. 12/195,244.

* cited by examiner

NETWORK-BASED STORAGE SYSTEM CAPABLE OF ALLOCATING STORAGE PARTITIONS TO HOSTS

PRIORITY CLAIM

This application is a division of U.S. application Ser. No. 11/683,944, filed Mar. 8, 2007 now U.S. Pat. No. 7,428,581, which is a continuation of U.S. application Ser. No. 09/927,894, filed Aug. 10, 2001 now U.S. Pat. No. 7,392,291, which claims the benefit of U.S. Provisional Appl. No. 60/224,664, filed Aug. 11, 2000. The disclosures of the aforesaid applications are hereby incorporated by reference.

APPENDICES

This specification includes appendices A-D which contain details of a commercial implementation. The appendices are provided for illustrative purposes, and not to define or limit the scope of the invention.

BACKGROUND OF THE INVENTION

1. Field of the Invention

The present invention relates to storage systems for computer networks, and more specifically, relates to software architectures for providing block level access to storage resources on a network.

2. Description of the Related Art

Various types of architectures exist for allowing host computers to share hard disk drives and other storage resources on a computer network. One common type of architecture involves the use of a central file manager. One problem with this architecture is that the failure of the central file manager can render the entire system inoperable. Another problem is that many software applications are not designed to use a central file manager.

Some storage architectures overcome these deficiencies by allowing the host computers to access the storage resources directly over the network, without the use of a central file manager. Typically, these architectures allow the host to access the storage resources over a network connection at the block level (as opposed to the file level).

SUMMARY OF THE INVENTION

The present invention comprises a system architecture for providing block-level access to storage resources, such as disk arrays, over a computer network without the need for a central file manager. The architecture embodies various inventive features that may be implemented individually or in combination.

One feature of the architecture is a mechanism for dividing the physical storage space or units of a block-level storage server into multiple partitions, and for allocating these partitions to hosts independently of one another. In a preferred embodiment, a partition can be allocated uniquely to a particular host, or can be allocated to a selected group of hosts (in which case different hosts may have different access privileges to the partition). The partition or partitions assigned to a particular host may appear, and can be managed as, one or more local disk drives.

BRIEF DESCRIPTION OF THE DRAWINGS

These and other features will now be described with reference to the drawings of certain embodiments of the invention, which are intended to illustrate, and not limit, the scope of the invention.

DETAILED DESCRIPTION OF PREFERRED EMBODIMENTS

The system architecture described in this section, and in the attached appendices, embodies various inventive features that may be used individually or in combination. Some of these features may be implemented without others, and/or may be implemented differently than set forth herein, without departing from the scope of the invention as defined by the appended claims.

I. Overview

The present invention comprises a system architecture for providing block-level storage access over one or more computer networks. The architecture is designed to incorporate any number of host computers and block-level storage servers communicating across a network or a combination of networks. In one embodiment, the architecture exports virtualized storage blocks over TCP/IP connections. Because TCP/IP is used for communications between the host computers and block-level storage servers in a preferred embodiment, a variety of network topologies can be used to interconnect the host computers and the block servers of a given system. For example, for relatively small systems, the host computers and storage servers can be interconnected by a hub, while for larger systems, the hub may be replaced with a switch.

Figure 1:
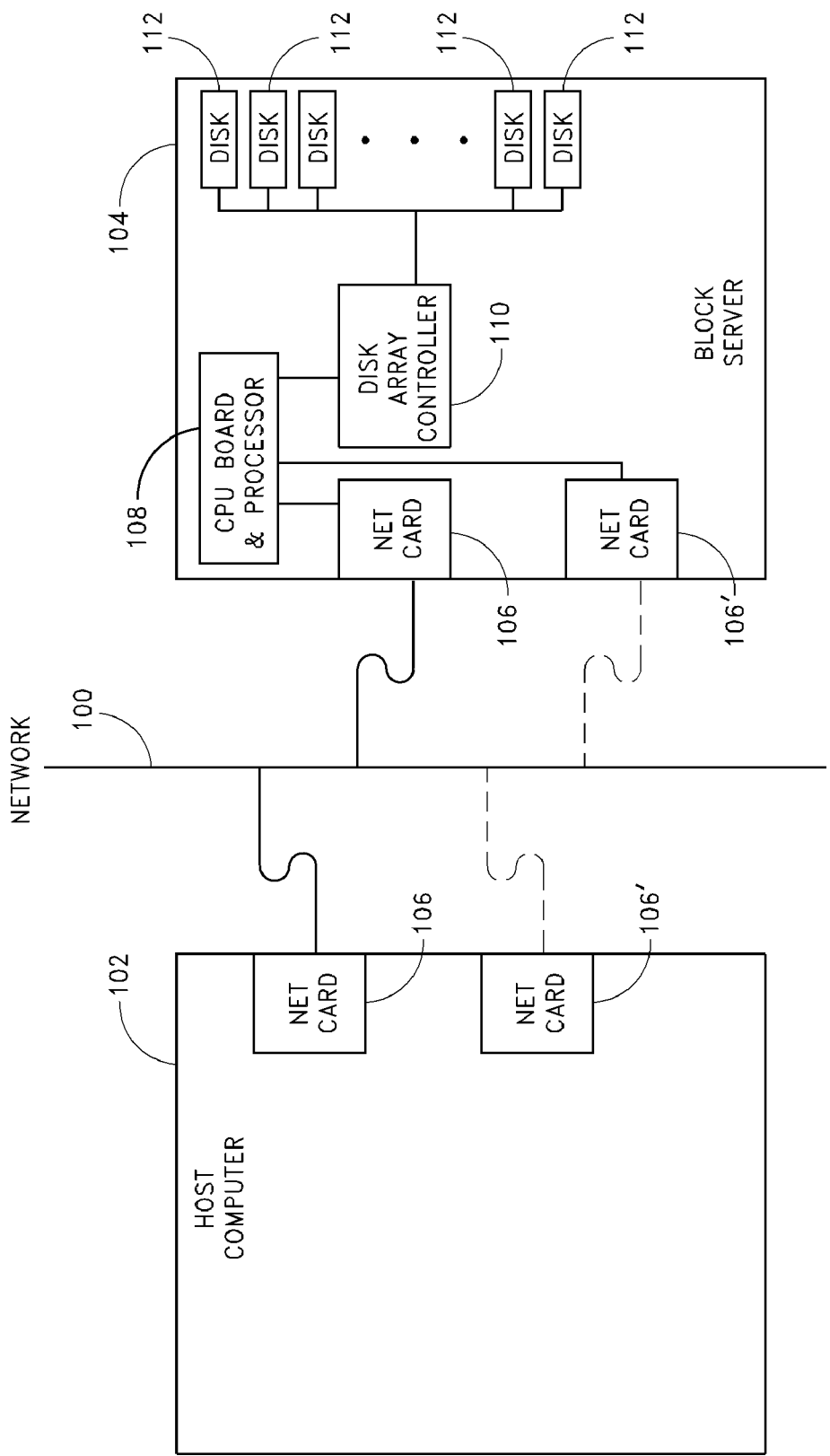
FIG. 1 illustrates the primary hardware components of an example system in which the invention may be embodied, including a host computer and a block server.

Depicted in FIG. 1 are the hardware components of a typical system that embodies the invention. The system includes a host computer 102 ("host") and a block-level IP storage server 104 ("block server") interconnected by a network 100 via respective network interface cards 106, such as 10/100/1000 Base-T or 1000 Base-SX Gigabit Ethernet cards. The host computer 102 may be a standard PC or workstation configured to operate as a server or as a user computer. The block server 104 may be a network-attached IP storage box or device which provides block-level data storage services for host computers 102 on the network 100.

In the illustrated embodiment, the block server 104 includes a disk array controller 110 that controls an array of disk drives 112. A disk array controller 110 of the type described in U.S. Pat. No. 6,098,114 may be used for this purpose, in which case the disk drives 112 may be ATA/IDE drives. The disk array controller may support a variety of disk array configurations, such as RAID 0, RAID 5, RAID 10, and JBOD, and is preferably capable of processing multiple I/O requests in parallel. The block server 104 also includes a CPU board and processor 108 for executing device drivers and related software. The block server may also include volatile RAM (not shown) for caching I/O data, and may include flash or other non-volatile solid state memory for storing configuration information (see FIG. 8).

In one embodiment, the network 100 may be any type or combination of networks that support TCP/IP sockets, including but not limited to Local Area Networks (LANs), wireless LANs (e.g., 802.11 WLANs), Wide Area Networks (WANs), the Internet, and direct connections. One common configuration is to locally interconnect the hosts 102 and block servers 104 by an Ethernet network to create an Ethernet-based SAN (Storage Area Network). As depicted by dashed lines in FIG. 1, the host and the block server 102, 104 may be interconnected by a second network 100', using a second set of network cards 106', to provide increased fault tolerance (as described below). The two networks 100, 100' may be disparate networks that use different mediums and provide different transfer speeds. Some of the various network options are described in more detail below with reference to FIG. 3.

Figure 2:
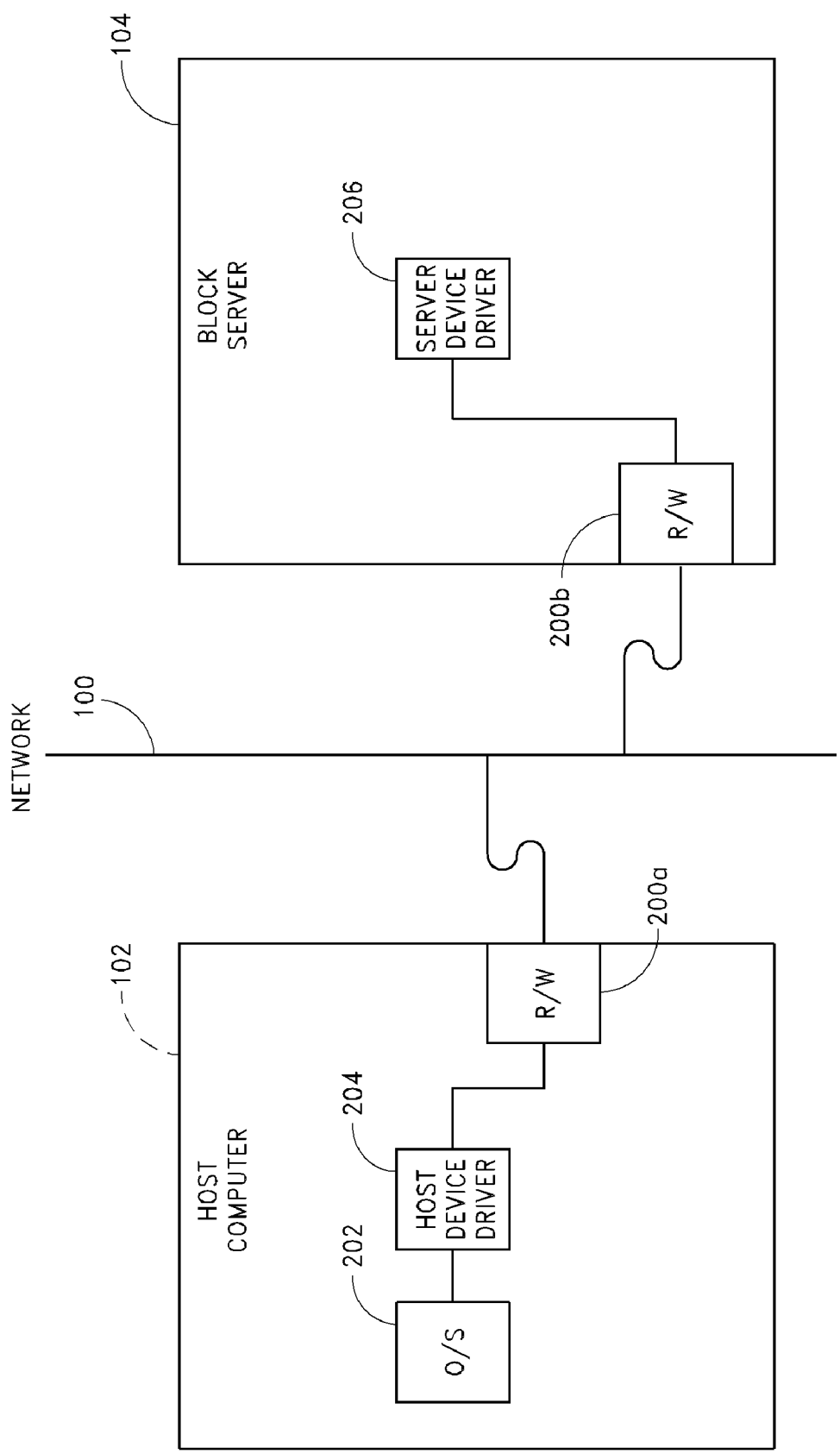
FIG. 2 illustrates the software architecture of the system of FIG. 1, including host-side and server-side device drivers and reader/writer (RW) components that operate according to the invention.

The software components of the architecture are shown in FIG. 2. The host side 102 of the software architecture includes an operating system (O/S) 202 such as Unix, Windows NT, or Linux; a host-side device driver 204 ("host driver") which communicates with the operating system 202; and a reader/writer (RW) component 200*a* (also referred to as an "agent") which communicates with the host driver 204. The storage side 104 of the software architecture includes a reader/writer (RW) component 200*b* and a storage-side device driver 206 ("server driver") that are executed by the CPU board's processor 108 (FIG. 1). The server driver 206 initiates disk operations in response to I/O requests received from the server-side RW component 200*b*.

The RW components 200*a*, 200*b* are preferably executed as separate processes that are established in pairs (one host-side RW process and one server-side RW process), with each pair dedicated to a respective TCP/IP socket over a network 100. The host RW 200*a* operates generally by "reading" I/O requests from the host driver 204, and "writing" these requests onto the network 100. Similarly, the storage RW 200*b* operates generally by reading I/O requests from the network 100 and writing these requests to the server driver 206. This process can occur simultaneously with transfers by other RW pairs, and can occur in any direction across the network 100. The RW components 200 also preferably perform error checking of transferred I/O data.

Each RW process (and its corresponding socket) preferably remains persistent on its respective machine 102, 104, and processes I/O requests one at-a-time on a first-in-first-out basis until the connection fails or is terminated. A host computer 102 establishes a socket by sending a service request over a dedicated configuration socket to the relevant block server 104. Once a socket connection is established between a RW pair 200*a*, 200*b*, the socket handles bi-directional traffic between the host computer 102 and block server 104.

In the illustrated embodiment, the RW components 200 run as processes that are separate from the host and server drivers 204, 206, respectively. The host-side 200*a* and storage-side 200*b* RW could alternatively be implemented, for example, as one or more of the following: (a) part of the host and server drivers 204, 206 (respectively), (b) separate device drivers 204, 206 (respectively), (c) separate kernel threads, (d) multiple threads within a single process, (e) multiple threads within multiple processes, and (f) multiple processes within a single thread.

A host computer 102 may establish multiple logical connections (sockets) to a given block server 104, and/or establish sockets to multiple different block servers 104 (as discussed below). An important benefit of this feature is that it allows multiple I/O requests from the same host to be processed concurrently (each over a separate socket) in a non-blocking manner—if one socket fails, the I/O requests being performed over other sockets are not affected. Each socket is managed by a respective RW pair.

An important function of the host driver 204 is that of virtualizing the storage provided by the block servers 204, so that all higher-level software processes on the host, such as the operating system and other user-level processes, view the block server storage as one or more local, physical disk drives. To accomplish this task, the host driver dynamically assigns I/O requests to TCP/IP socket connections without revealing the existence of such connections, or any other network details, to user-level processes. The block server 104 preferably appears to the host's user-level processes as a SCSI device, allowing conventional volume managers to be used.

As described below in sub-section III, one embodiment of the architecture permits the physical storage of a block server 104 to be divided into multiple, variable-size partitions. Each such partition may be independently allocated to one or more hosts, and may configured such that it is viewed and managed as a separate physical disk drive. In other embodiments, block-level access may be provided to the hosts without partitioning.

Figure 3:
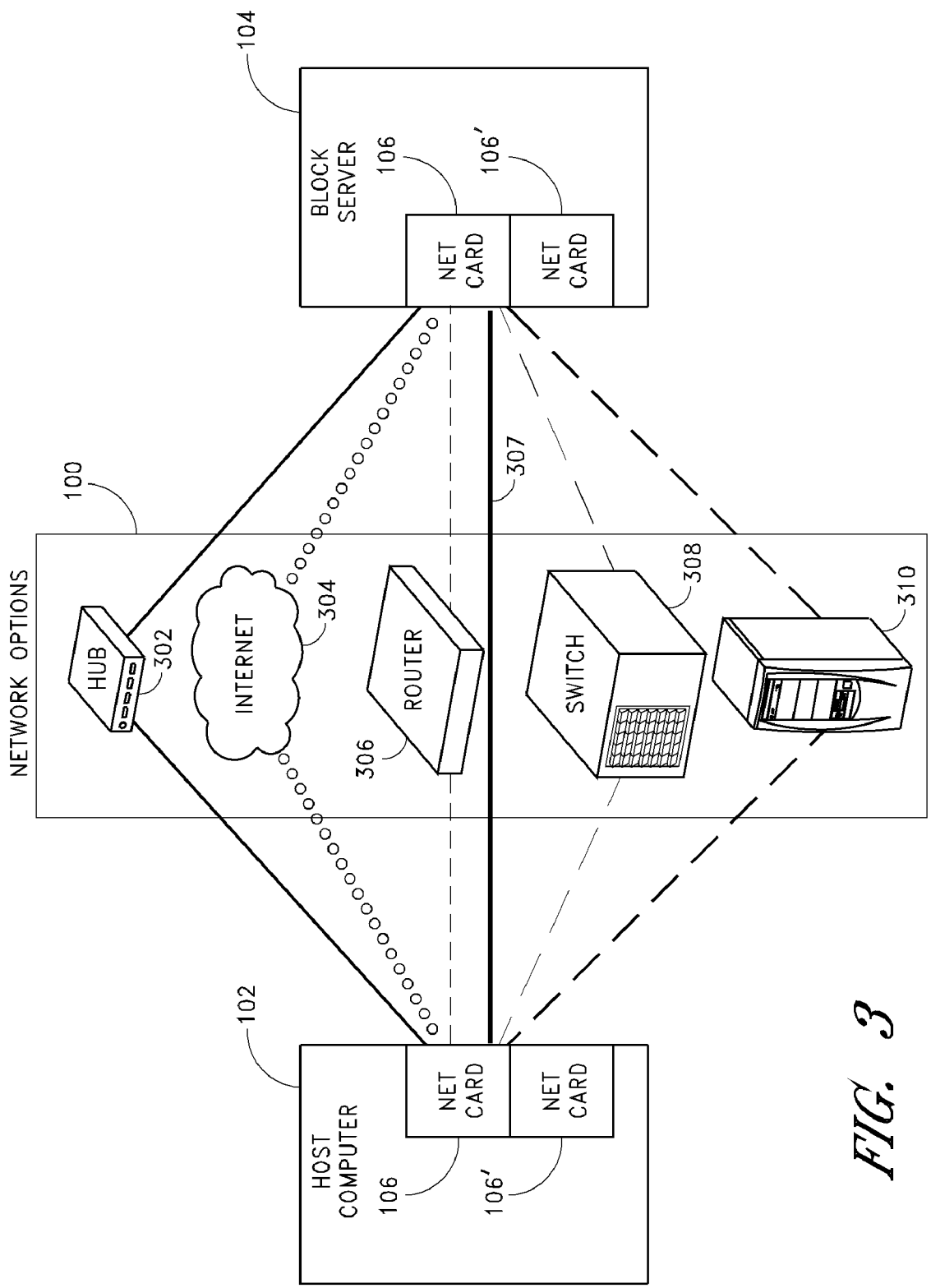
FIG. 3 illustrates examples of the types of networks and network components that can be used to interconnect the hosts and block servers.

FIG. 3 shows some of the various networks 100 and network components that may be used to interconnect the host 102 and block servers 104 of a given system. These include a hub 302 (commonly used to connect LAN segments), the Internet 304, a router 306 (a computer that forwards packets according to header information), a switch 308 (a device that filters and forwards packets between LAN segments), and a gateway 310 (a computer that interconnects two different types of networks). The system architecture allows any combination of these network options to be used to interconnect a given host computer 102 and block server 104.

An important feature of the architecture is that when the network 100 becomes inundated with traffic, a network 100 administrator can either add network 100 capabilities on the fly or change the network 100 hardware without causing any loss of data. The host-side 102 and storage-side 104 software components are configured, using conventional methods, to detect and use new network 100 connections as they become available, and to retry operations until a connection is established. For example, a network 100 administrator could initially connect thirty host computers 102 to a small number of block servers 104 using a network hub 302. When the number of computers reaches a level at which the network hub 302 is no longer suitable, a 1000-port switch could be added to the network 100 and the hub 302 removed without taking the network 100 off-line. The architecture functions this way because the host RW 200*a* creates a new sockets connection to the storage RW 200*b* automatically as new physical connections become available.

The architecture and associated storage control protocol present the storage resources to the host computers 102 as a logically contiguous array of bytes which are accessible in blocks (e.g., of 512 bytes). The logical data structures of the implementation support byte level access, but disk drives typically export blocks which are of a predetermined size, in bytes. Thus, to access a given block, a block address (sector number) and a count of the number of blocks (sectors) is provided. In one embodiment, the protocol exports a 64-bit logical block address (LBA) and 64-bit sector count. On write operations, the I/O write data request is packaged into a block structure on the host side 102. The block request and data are sent to the block server 104 over one or more of the socket connections managed by the host RW processes 200a. The architecture also allows data to be stored non-sequentially and allows for the storage medium to efficiently partition space and reclaim unused segments.

Figure 4:
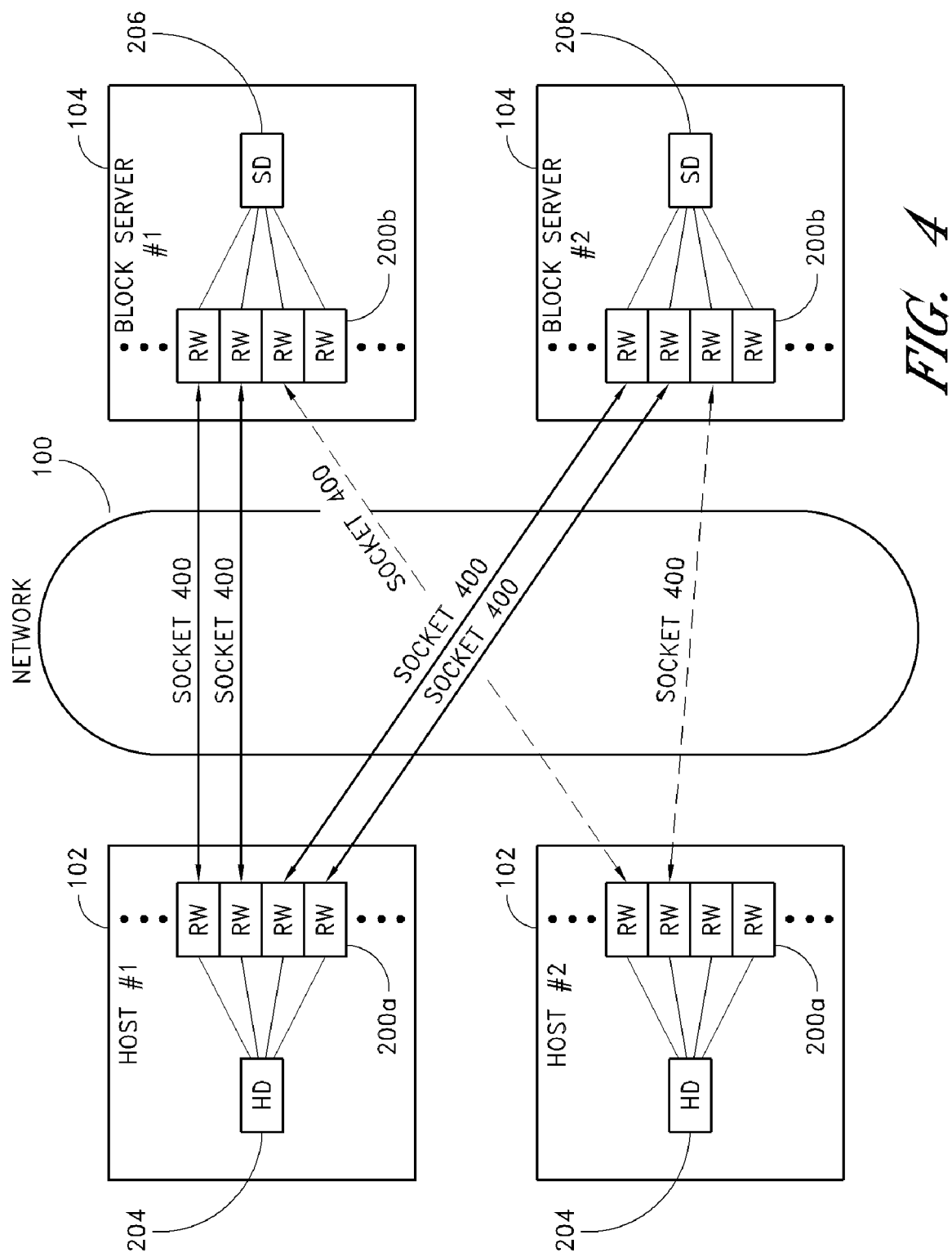
FIG. 4 shows, in example form, how the concurrent socket connections are established between pairs of reader/writer components.

Depicted in FIG. 4 are sample socket connections 400 made by RW pairs 200 connecting over a network 100 to link host computers 102 to block servers 104. As mentioned above, the network 100 may actually consist of multiple networks 100, including fully redundant networks 100. Each host computer 102 can open one or more socket connections 400 (using corresponding RW pairs) to any one or more block servers 104 as needed to process I/O requests. New socket connections 400 can be opened, for example, in response to long network 100 response times, failed socket connections 400, the availability of new physical connections, and increases in I/O requests. For example, a host computer 102 can initially open two sockets 400 to a first block server 104; and subsequently open two more sockets 400 to another block server 104 as additional storage resources are needed. Another host computer 102 may have open socket connections 400 to the same set of block servers 104 as shown. As described above, each socket 400 acts as an independent pipeline for handling I/O requests, and remains open until either an error occurs or the host 102 terminates the socket connection 400.

II. Processing of Input/Output Requests

Figure 5:
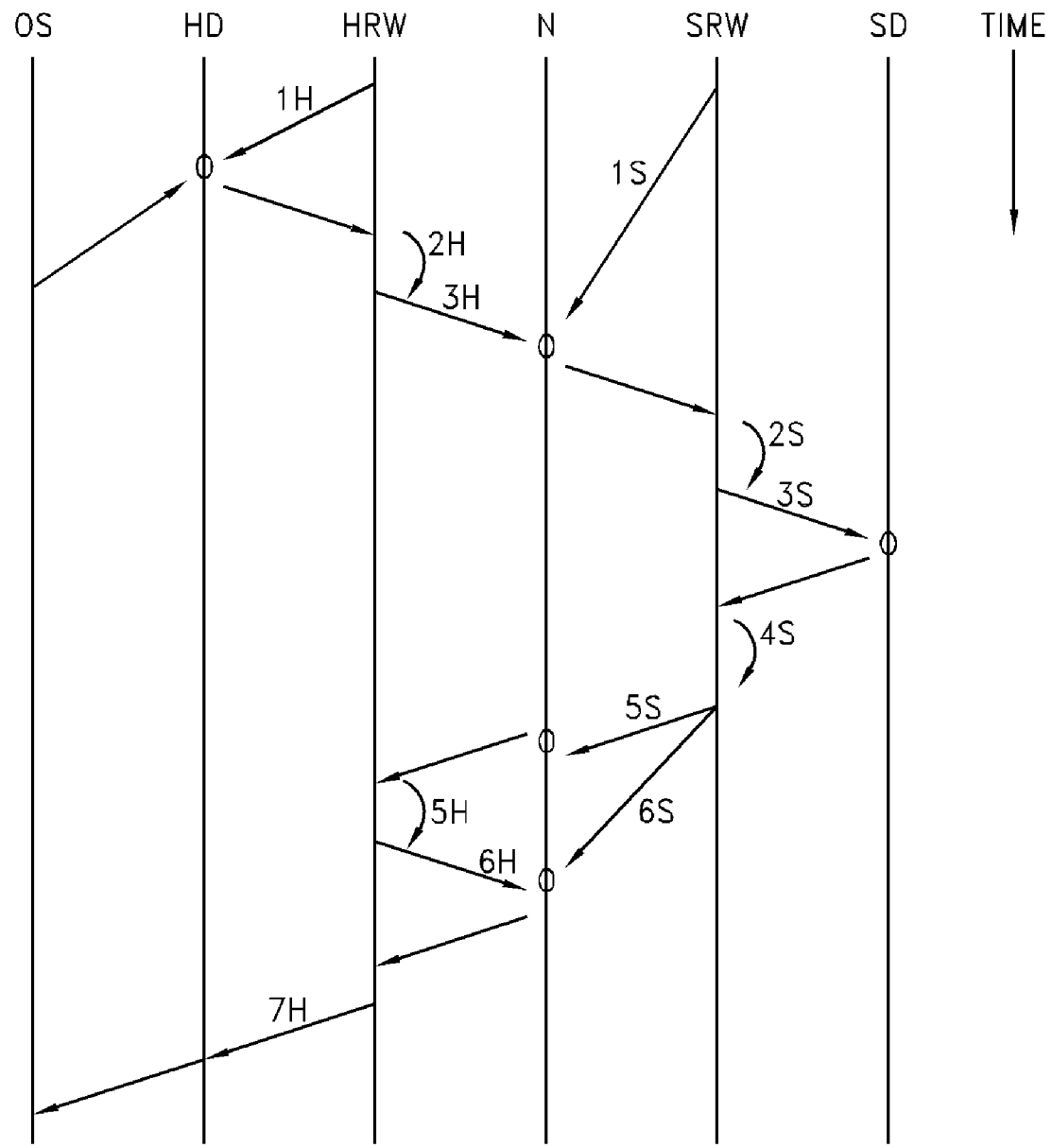
FIG. 5 illustrates the flow of information between components when a host computer performs a read from a block server.
Figure 6:
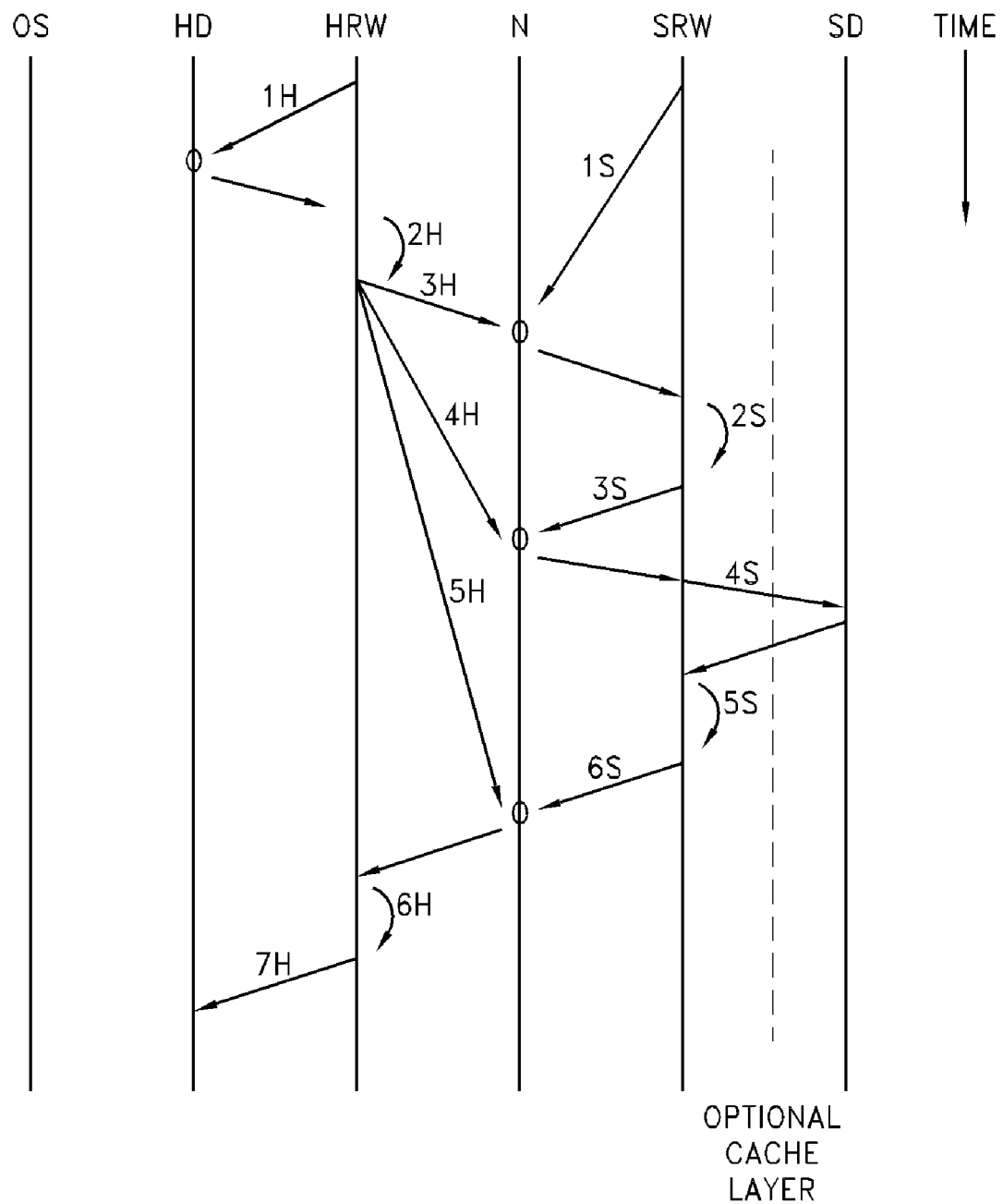
FIG. 6 illustrates the flow of information between components when a host computer performs a write to a block server.

FIGS. 5 and 6 illustrate a network storage protocol that may be used for I/O read operations and write operations (respectively) between a host computer 102 and a block server 104 over a socket connection 400. Located at the tops of the vertical lines in FIGS. 5 and 6 are abbreviations that denote components as follows.

OS=Operating System
HD=Host Driver 204
HRW=Host Computer's Reader/Writer 200a
N=Network
SRW=Server Reader/Writer 200b (of block server)
SD=Server Driver 206 (of block server)

Time increases, but is not shown to scale, in these diagrams moving from top to bottom. Arrows from one vertical line to another generally represent the flow of messages or data between components. An arrow that begins and ends at the same component (vertical line) represents an action performed by that component. The small circles in the figures represent rendezvous events.

In one embodiment, as shown in FIG. 5, the host reader/writer (HRW) initially sends a request 1H to the host driver (HD) for an I/O command packet, indicating that the socket is available for use. This step can be viewed as the message "if you have work to do, give it to me." The host driver eventually responds to this request by returning a command packet that specifies an I/O request, as shown. As represented by the arrow labeled 2H, the host reader/writer (HRW) translates the command packet into a network-generalized order. This step allows different, cross platform, computer languages to function on a common network 100. The local computational transformation of a host command packet, or host language, to a network command packet, or network language, is architecture specific.

At this point, the host reader/writer (HRW) generates two networks events, 3H and 4H. Message 4H represents a post of a received network response packet, from 3H, across the network 100 and is discussed below. Message 3H represents the network generalized command packet being written over a pre-existing "pinned-up" TCP/IP connection. In order for this transfer to occur in the preferred embodiment, a rendezvous must take place with 1S, which represents a network 100 request to receive the command packet. This request 1S has the ability to wait indefinitely if there is no "work" to be done. Once the network 100 rendezvous is satisfied, the command packet is received by the block server's reader/writer (SRW), and is re-translated by the SRW to the server-side language via step 2S. Step 2S is similar to the translation of the host command packet to a network command packet shown in 2H.

As further illustrated in FIG. 5, message 3S represents the server-side reader/writer posting the command packet to the server driver (SD) 206. Included in the command packet are the following: an I/O unit number (a small integer that is a logical identifier for the underlying disk drive partition on any form of storage disks), a command (a small integer indicating the type of command, such as a read operation or a write operation), a starting logical block address (an integer indicating the starting block or sector for the I/O operation), and the block count (an integer indicating the number of blocks or sectors for the I/O operation).

After the command packet is delivered to the server device driver (SD), a response is sent back to the server-side reader/writer (SRW). As depicted by 4S, the server-side reader/writer transforms this response packet from storage-side order to network order via step 4S. Subsequently, as depicted by 5S and 6S, both a network write of the response packet (5S) and a network write of the I/O data from the read (6S) occur simultaneously.

A rendezvous thereafter occurs between the response packet (5S) and the network read request (4H), representing satisfaction of the network read request. This step is performed for two reasons: (1) to determine whether the network response packet contains completion status after it has been checked for errors, and (2) if the read operation failed, to prevent the requested data from being returned to the host 102. After they meet, the network response packet is translated into the host response packet language in 5H.

Next, there is a network read request 6H for the I/O (read) data. This request 6H is satisfied by the network write 6S of the I/O read data, causing the I/O read data to be transferred to the host computer. Finally, in 7H, the host reader/writer notifies the host driver, and the host driver notifies the operating system, that the I/O operation is complete.

With regard to the write operations shown in FIG. 6, the steps are similar up through 3S. The description below will show the remaining steps with regard to the remaining I/O data transfers and network 100 operations.

The write data associated with this I/O operation is received by the network 100 and a receive operation is posted by the block server 104 to the network 100 in step 3S. This network read occurs subsequent to the translation of the network command packet to storage system language in step 2S. This ensures that a network read operation is posted for the proper size subsequent to error checking of the network command packet. In step 4S, the block server 104 sends the storage system command packet to the server driver (SD). This command packet contains the same type of information as described for the read case. The SD returns a response packet subsequent to the logical (or physical) completion of the specified write operation which is subsequently converted to network order in step 5S. This network response packet is sent to the host computer 102 via a send to network command in step 6S. This network response packet is received by the host computer 102 and translated to a host response packet in step 6H. Subsequently, the host computer 102 sends a command to the HD to complete the I/O operation. Steps 6H and 7H are similar to the steps of the read operation in FIG. 5 in which the host reader/writer notifies the host driver, and the host driver notifies the operating system, that the I/O operation is complete.

Appendix A and B include additional details of the host and server side logic according to one embodiment of the invention. In addition, Appendix C specifies implementation details of one embodiment of the protocol by which the hosts 102 and block servers 104 communicate. Certain portions of these appendices correspond to prototype implementations in which only some of the system's functions are enabled.

Figure 7:
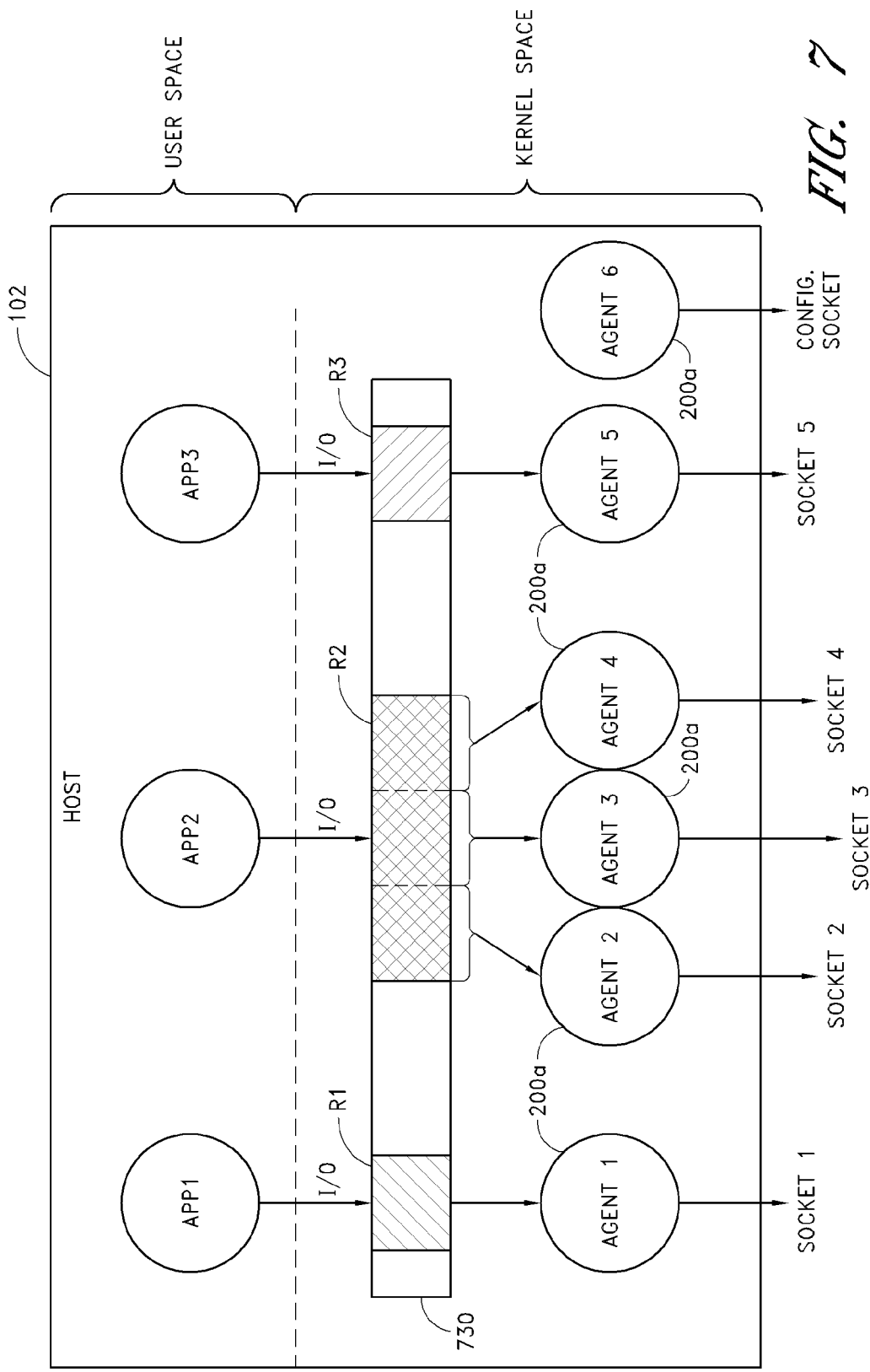
FIG. 7 illustrates how I/O requests are assigned to socket connections transparently to user-level applications, and illustrates how an I/O request may be subdivided for processing over multiple TCP/IP connections.

FIG. 7 illustrates how the I/O requests from user-level applications are dynamically assigned to TCP/IP socket connections transparently to these applications, and thus without the need for a fixed mapping between applications and sockets. The drawing also illustrates how, in one embodiment, an I/O request can be subdivided into smaller operations which can be issued and performed in parallel over multiple socket connections. In this illustration, the host-side RW components 200a are labeled as "agents."

In this example, I/O requests from multiple applications (APP1-APP3) running on the host 102 are being processed concurrently over multiple TCP/IP connections. Specifically, each of the applications has placed a respective I/O request, R1-R3, into a request queue 730. When an I/O request is placed into the request queue 730, the next available agent 200a having a connection to the relevant block server responds by retrieving the request from the queue and beginning processing of the request. In this example, a first agent, Agent 1, retrieves request R1 and begins processing of R1 over its respective socket connection. Similarly, request R3 is retrieved by Agent 5, which processes the request to completion over its respective socket. The I/O request R2 from APP2, however involves a larger data transfer. The host driver therefore parses R2 into three constituent I/O requests or operations, each of which is processed by a respective agent (Agents 2, 3 and 4) over a respective socket connection in the same manner as an ordinary I/O request. The sub-requests of I/O request R2 are thus processed in parallel over multiple connections, allowing for increased performance.

In one embodiment, I/O requests involving data transfers of over 64 kilobytes are subdivided into I/O requests of blocks of 64 k bytes or less. Each constituent I/O request is appropriately tagged with an identifier of the original application-level I/O request to which it corresponds. Once all of the constituent I/O requests are completed, the host driver reports the completion of the application-level I/O request. An important benefit of this feature is that the amount of network bandwidth allocated to each I/O request is generally proportional to the amount of I/O data being transferred.

III. Allocation of Partitions to Hosts

One feature that may be incorporated into the architecture is a mechanism for effectively dividing the physical storage space of each block server 104 into smaller units, and allocating or assigning these units to individual hosts 102. Using this feature, a block server can be shared by multiple hosts 102, each of which may "see" its own private disk drive or set of disk drives. One embodiment of this feature is depicted in FIG. 8.

Figure 8:
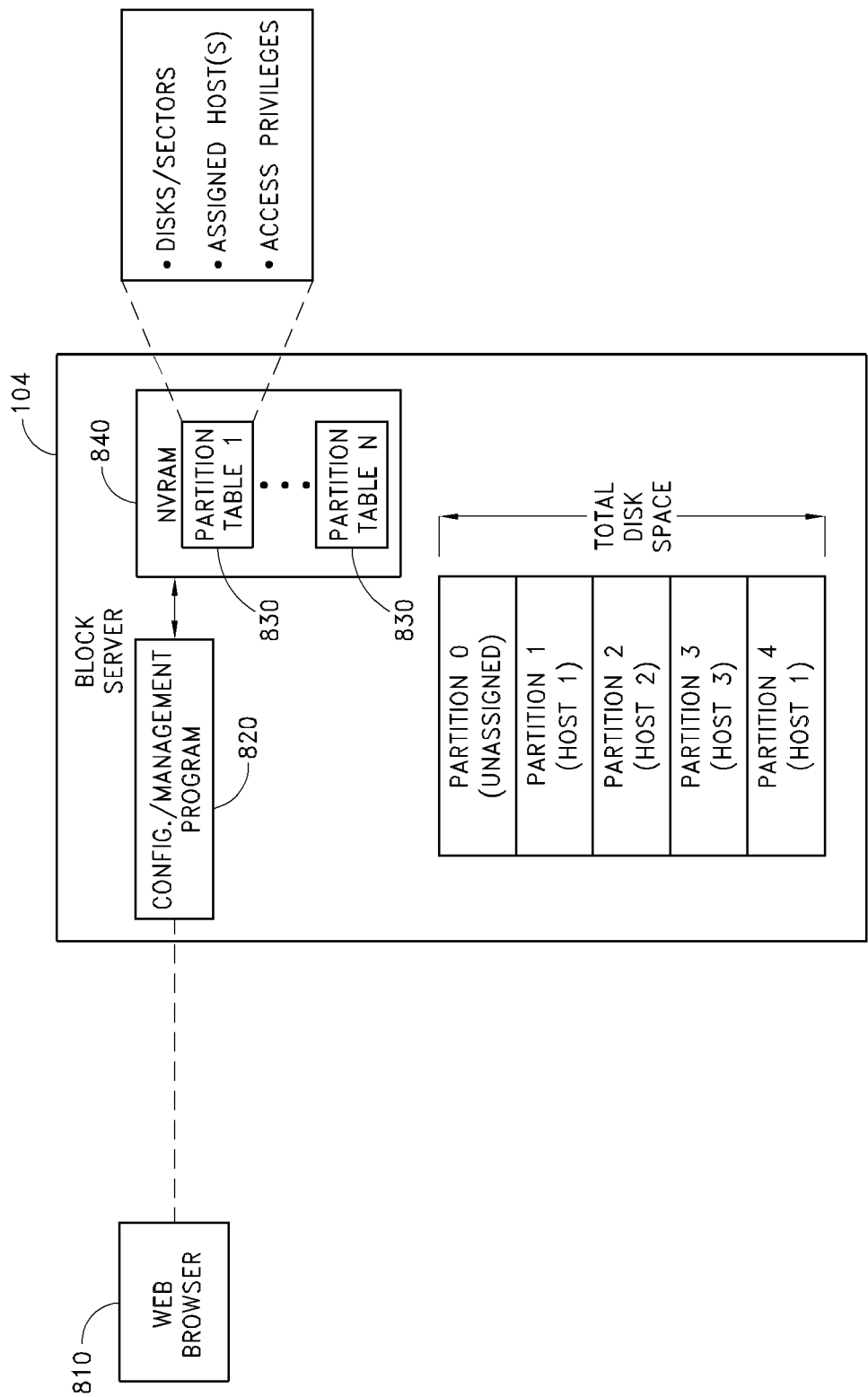
FIG. 8 illustrates how the physical storage of a block server may be divided into multiple partitions, each of which may be independently allocated to one or more host computer.

As illustrated in FIG. 8, the total disk space of each block server 104 may be segmented or subdivided into multiple, variable-size data storage units or "partitions," each of which may have access privileges independently of other partitions. These storage partitions are preferably created and allocated by a network administrator using either a standard web browser 810 to connect to a configuration and management program 820 running on the block server 104, or by using a command-line interface utility to connect directly to a command shell interpreter running on the block server 104 (not illustrated).

Each partition can be independently configured with attributes such as size, "read-only," "read-write," or zero data before access, and with a list of authorized hosts 102. For example, Partition #1 could be configured to be "20 GB read-only from Host A and read-write from Hosts B and C," while Partition #2 could be configured as "40 GB read-write from Host A only." In addition, each partition can be securely exported to a different host computer 102 in a manner which allows the partition to be viewed and managed by the host's user-level software processes as a separate physical disk drive.

In a preferred embodiment, each partition can include the storage space of multiple disk drives 112. In addition, the storage space of any given disk drive 112 can be subdivided for purposes of creating partitions. For each of the one or more partitions currently defined within the block server 104, the configuration/management program 820 maintains a respective partition table 830 in flash or other non-volatile memory 840 of the block server 104. This table 830 includes configuration data specifying the disk drive(s) and sectors included in the partition, the IP address(es) of the one or more hosts 102 that are authorized to use that partition, and the associated access privileges. The partition tables 830, or another configuration structure stored in the non-volatile memory 840, also preferably includes default or administrator-specified data indicating the maximum number of socket connections that may be established by each host for I/O operations with that block server. As described in the following subsection, during boot-up, a host 102 preferably establishes a dedicated configuration socket connection 400 to each block server 104 it locates, and uses this configuration connection to obtain a list of the partitions that are assigned to it (if any) and the sizes of these partitions.

In one implementation, up to one hundred partitions can be created per block server 104, and up to sixteen partitions can be assigned to any given host 102. Each host 102 sees each of its partitions starting at logical block address (LBA) zero. The block server 104 maps the (IP address, partition number, LBA) tuple sent in each I/O request into a "physical LBA" for the I/O request. Access to partitions is preferably granted or denied by the block server 104 based on the IP address of the requesting host 102.

Using this feature of the architecture, network administrators can flexibly and dynamically allocate block server storage resources to hosts 104 transparently to the application-level software running on the hosts. In the example shown in FIG. 8, the block server 104 has five segments or partitions, each having a variable size. Partition 0 represents the unassigned or "free" disk space available on the block server, which may be used to create additional partitions and/or to increase the sizes of previously allocated partitions. Initially, partitions 1, 2 and 3 in this example were created and assigned to hosts 1, 2 and 3, respectively. Subsequently, in order to accommodate an increased storage demand of host 1, a new partition, partition 4, was created and assigned to host 1. The two partitions (1 and 4) uniquely allocated host 1 may be configured to appear as either a single drive segment of a disk drive installed directly in the host 1 computer 102, or as two distinct and separate disk drives. Although the partitions are shown in FIG. 8 as being uniquely assigned to hosts 102, a partition can be assigned to a group of two or more hosts 102.

The configuration/management program 820 preferably supports a variety of commands and functions for permitting administrators to create and manage partitions. In addition to those functions mentioned above, the program 820 provides functions for deleting partitions and for changing partition ownership. Space from deleted partitions is preferably reclaimed, and re-allocated, using a "best fit" algorithm.

IV. Authentication and Discovery

Another feature that may be incorporated into the architecture is a protocol for allowing the block servers 104 to authenticate the hosts 102. Specifically, rather than allowing I/O to proceed immediately, each block server 104 may be designed to authenticate a new host 102 before allowing that host to perform I/O operations. In a preferred embodiment, the authentication process is performed as part of an "authentication and discovery" protocol embodied within the host and server side drivers 204, 206.

Specifically, in a preferred embodiment, a host 102 locates the available block servers 104 at boot-up time using one of one of two methods: (1) using a host-side configuration file previously set up by an administrator, or (2) using a broadcast packet to discover all of the block servers 104 on its subnet. Each block server 104 preferably includes a daemon process that allows it to be located and configured remotely over the network, but without IP, according to method 2. For each block server 104 located, the host then enters into an authentication and discovery phase, a preferred embodiment of which is illustrated in FIG. 8 without error states.

Figure 9:
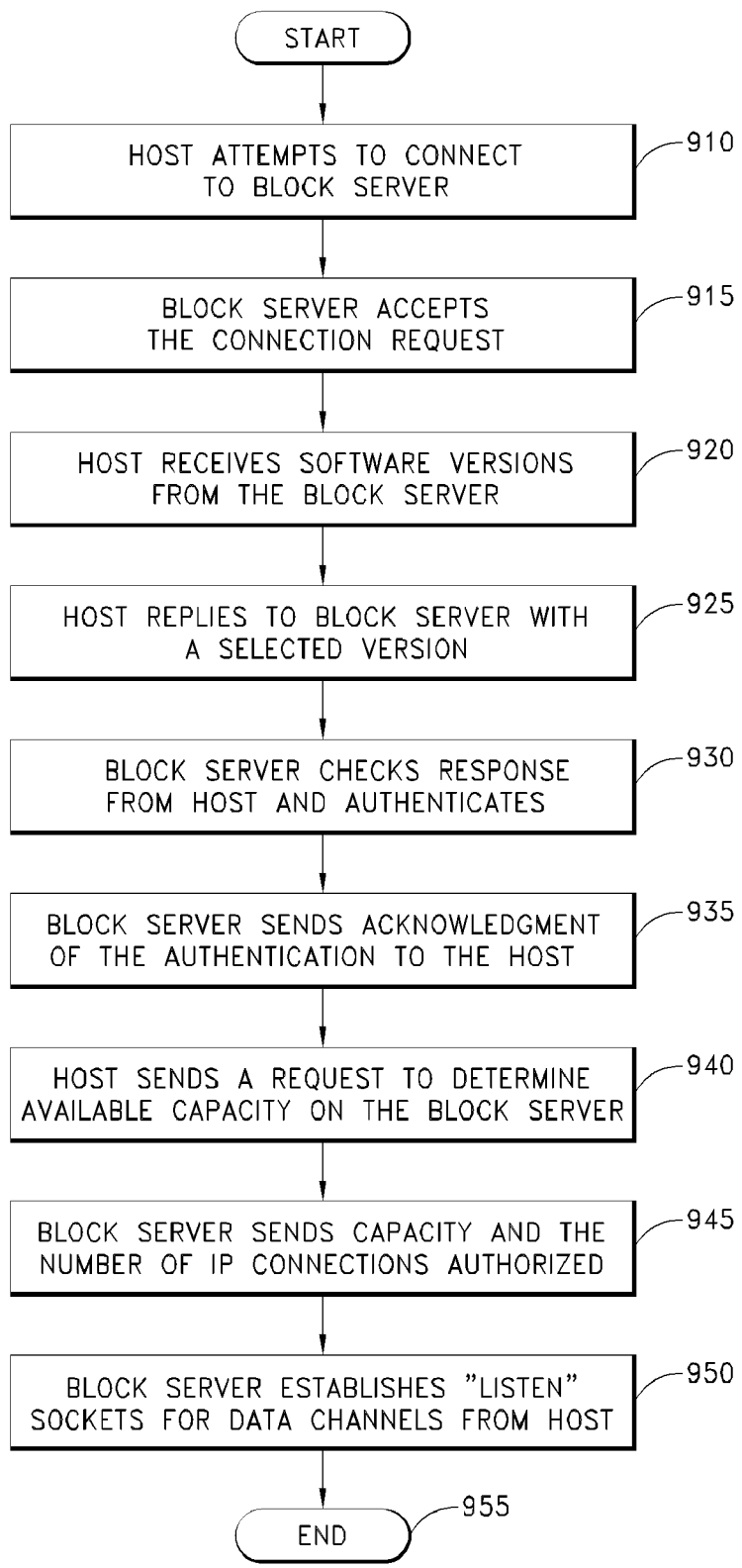
FIG. 9 illustrates an authentication and discovery protocol through which a host computer is authenticated by a block server, and then obtains information for accessing the block server.

As depicted by state 910 in FIG. 9, the host 102 initially sends a connection request to the located block server 104, and the block server 104 responds in state 915 by accepting the request. In state 920, the block server 104 returns a list of software versions that are supported by the block server 104, as well as a random number generated by the block server which serves as an authentication "challenge." In state 925, the host 102 selects the appropriate version from the list and replies to the block server 104. The host 102 also performs a predefined set of mathematical operations on the random number received from the block server 104. These operations are preferably different for each version of the protocol, making it easy to strengthen the security architecture simply by adding new versions. The number derived from the random "challenge" sent by the block server 104, as the result of the mathematical operations as specified by the version, is sent back to the block server 104 as the host's "response" to the challenge. The block server 104 then authenticates the host 102 in state 930 by determining the expected response (given the challenge sent and the version that was selected), and comparing this expected response to the actual response from the host 102. If the response does not match the expected response, access is denied and all the sockets between the host 102 and the block server 104 are closed (not shown). Otherwise, in state 935, the block server 104 sends an acknowledgement back to the host 102 indicating that the authentication was successful.

In state 940, the host 102 sends a request to determine the available capacity allocated to it in the given block server 104. In state 945, the block server 104 responds to the host 102 with data specifying the number of partitions assigned to that host and the sizes of these partitions. The block server 104 also returns data specifying the maximum number of data connections that may be established between the host 102 and the block server 104 for I/O traffic, and specifying the dynamic ports that may be used to establish these connections. In state 950, the block server 104 establishes "listen" sockets for traffic originating from an authorized host 102. The host may thereafter establish connections to these sockets up to the maximum number of data connections specified by the block server.

Thus, upon completion of the authentication and discovery phase between a host 102 and a particular block server 104, the host 102 has been informed of the following information about that block server: (1) which dynamic ports the host can connect to for data, (2) the number of partitions assigned to the host, and (3) the sizes of these partitions.

Additional details of a commercial implementation of the authentication and discovery phase are provided in Appendix D. The term "Network Storage Unit," or "NSU," is used throughout Appendix D to refer to a commercial implementation of the block servers 104.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the appended claims.

APPENDIX A

The following is a pseudocode representation of the host side logic, including error checking, with comments.

```
/*
 * This is the host side (h-box) data transfer logic
 * including error checking and comments
 */
#define H_DBSIZE    256*512/* 256 sectors of 512 bytes*/
h_cmdpacket is the host side command packet defined by the driver
n_cmdpacket is the network command packet defined by 3ware
struct  hioctlbuf {
            pid_t    ioc_pid;                       /* For debugging purposes */
            struct   h_cmdpacket *ioc_cp;           /* Command packet pointer*/
            struct   h_cmdpacket *ioc_rp;           /* Response packet pointer*/
            char     *ioc_dp;                       /* Data pointer          */
} iocbuf;
{
            static   pid_t    mypid = (pid_t)0;
            struct   h_cmdpacket h_command, h_response, *cpp, *rpp;
            struct   n_cmdpacket n_command, n_response, *ncpp, *nrpp;
            char     h_databuf[H_DBSIZE];
```

```
int                 ret;
mypid       = mypid ? mypid : getpid( );
cpp         = &h_command;
ncpp        = &n_command;
rpp         = &h_response;
nrpp        = &n_response;
iocbuf.ioc_pid  = mypid;
iocbuf.ioc_cp   = cpp;
iocbuf.ioc_rp   = rpp;
iocbuf.ioc_dp   = h_databuf;
while (more work to do) {
        /* (1) Issue the ioctl to fetch the command to process*/
        /* (1) The data comes "for free" on a write */
        ret = ioctl(3whndd_fd, IOC_NEXTCMD, &iocbuf);
        if (ret) {
                error("Ioctl to fetch command failed");
                continue;
        }
        if (invalid_cmdpacket(cpp)) {
                error("Ioctl to fetch command returned invalid command
                packet");
                continue;
        }
        /* (2) transform the host command packet to a network command packet */
        htoncmd(ncpp, cpp, connection_state);
        if (invalid_ncmdpacket(cpp)) {
                error("Invalid transformation to network command packet")
                continue;
        }
        /* (3) Send the network command packet to the s-box */
        ret = write(s-box.socket_fd, ncpp, sizeof(*ncpp));
        if (sizeof(*ncpp) != ret) {
                error("Network command write failed");
                continue;
        }
        /* (4) Write the data to the network in the write case*/
        if (iswrite(cpp)) {
                ret = write(s-box.socket_fd, h_databuf, writesize(cpp));
                if (writesize(cpp) != ret) {
                        error("Data write to network failed");
                        continue;
                }
        }
        /* (5) Read the response packet from the s-box side*/
        ret = read(s-box.socket_fd, nrpp, sizeof(nrpp));
        if (sizeof(*nrpp) != ret) {
                error("Network response packet read from network failed");
                continue;
        }
        if (invalid_nresponsepacket(nrpp)) {
                error("Invalid network response packet");
                continue;
        }
        ntohresponse(nrpp, rpp, connection_state);
        if (invalid_responsepacket(rpp)) {
                error("Invalid transformed network response packet");
                continue;
        }
        if (iosize(rpp) != iosize(cpp)) {
                error("Response and command io sizes differ\n");
                continue;
        }
        /* (6) Read the data (if required) from the s-box side*/
        if (isread(rpp)) {
                ret = read(s-box.socket_fd, h_databuf, readsize(rpp));
                if (readsize(rpp) != ret) {
                        error("Data read from network failed");
                        continue;
                }
        }
        /* (7) The following ioctl completes the read or write operation*/
        ret = ioctl(3whndd_fd, IOC_CMDCOMPLETE, &iocbuf);
        if (ret) {
                error("Ioctl to complete command failed");
                continue;
        }
}
```

APPENDIX B

The following is a pseudocode representation of the storage or block server side logic, including error checking, with comments.

```
/*
 * This is the block server (s-box) storage side data transfer
 * logic with error checking and comments
 */
#define  H_DBSIZE    256*512/*256 sectors of 512 bytes*/
h_cmdpacket is the host side command packet defined by the driver
n_cmdpacket is the network command packet defined by 3Ware
struct   hioctlbuf {
         pid_t    ioc_pid;              /* For debugging purposes */
         struct   h_cmdpacket *ioc_cp;  /* Command packet pointer*/
         struct   h_cmdpacket *ioc_rp;  /* Response packet pointer*/
         char     *ioc_dp;              /* Data pointer           */
} iocbuf;
{
         static   pid_t    mypid = (pid_t)0;
         struct   h_cmdpacket h_command, h_response, *cpp, *rpp;
         struct   n_cmdpacket n_command, n_response, *ncpp, *nrpp;
         char     h_databuf[H_DBSIZE];
         int               ret;
         mypid    = mypid ? mypid : getpid( );
         cpp      = &h_command;
         ncpp     = &n_command;
         rpp      = &h_response;
         nrpp     = &n_response;
         iocbuf.ioc_pid   = mypid;
         iocbuf.ioc_cp    = cpp;
         iocbuf.ioc_rp    = rpp;
         iocbuf.ioc_dp    = h_databuf;
         while (more work to do) {
                  /* (1) Fetch the command to process from the network*/
                  ret = read(h-box.socket_fd, ncpp, sizeof(ncpp));
                  if (sizeof(*ncpp) != ret) {
                           error("Network command packet read from network failed");
                           continue;
                  }
                  if (invalid_ncmdpacket(ncpp)) {
                           error("Invalid network command packet");
                           continue;
                  }
                  /* (2) Transform the command from network order to host order*/
                  ntohcommand(ncpp, cpp, connection_state);
                  if (invalid_cmdpacket(cpp)) {
                           error("Invalid transformed network command packet");
                           continue;
                  }
                  /* (3) Fetch any write data from the host*/
                  if (iswrite(cpp)) {
                           ret = read(h-box.socket_fd, h_databuf, writesize(cpp));
                           if (writesize(cpp) != ret) {
                                    error("Data read from network failed");
                                    continue;
                           }
                  }
                  /* (4) Map the host:z_lun to a 3wzndd_fd, honor ro*/
                  /* (4) Issue the ioctl to do the actual I/O w/status*/
                  ret = ioctl(3wzndd_fd, IOC_ZCMDCOMPLETE, &iocbuf);
                  if (ret) {
                           error("Ioctl to complete command failed");
                           continue;
                  }
                  if (invalid_responsepacket(rpp)) {
                           error("Invalid ioctl response packet");
                           continue;
                  }
                  /*      (6) Be a little more paranoid*/
                  htonresponse(nrpp, rpp, connection_state);
                  if (invalid_nresponsepacket(nrpp)) {
                           error("Invalid network response packet");
                           continue;
                  }
                  /* (7) First write the response*/
                  ret = write(s-box.socket_fd, nrpp, sizeof(*nrpp));
                  if (sizeof(*nrpp) != ret) {
```

```
            error("Network command write failed");
            continue;
        }
        /* (8) Then write any data */
        /*
         * The reverse order will deadlock if the disk read failed*/
        if (isread(cpp)) {
            ret = write(s-box.socket_fd, h_databuf readsize(cpp));
            if (readsize(cpp) != ret) {
                error("Data write to network failed");
                continue;
            }
        }
    }
}
```

APPENDIX C

This document describes the Storage Control Protocol (SCP) used by a client host computer to communicate with the block server.

The storage control protocol currently runs over TCP/IP and is available for various platforms. Examples of some of the supported operating systems include Windows NT, Linux, MacOS, Windows 2K, FreeBSD, and Solaris. This document is written mainly from the point of view of a client host computer.

A read or write command may request no more than 128 Kilobytes (128 KB) of data.

Connections

A single TCP/IP connection is all that is currently required to perform I/O with a block server. A block server process accepts incoming connections over a well known port. A host can use multiple TCP/IP connections to a single block server for redundancy and greater throughput.

An additional configuration connection or "control channel" is used for authentication and discovery (see Appendix D). The authentication and discovery process provides the host with the following information:

which dynamic ports a host may use to connect to a block server
the number of partitions that a block server has allocated to a particular host
the sizes of the partitions Establishing a Host Connection to a Block Server and Performing I/O Two pieces of information are needed for a host to connect to a block server:

(1) the name or IP address of the block server and
(2) the well-known port number where the block server accepts incoming connections.

A host may connect using the standard Berkeley sockets connect( )call. Note that the block server performs an accept( ) on a well-known port.

I/O Protocol

A host initiates a read or write by first sending a 512-byte request structure in network order to the block server. The data is read or written thereafter. The request structure (zn-req_t) is identical to the response (znres_t) structure. These structures are defined below. Pseudocode for a host follows:
1. Connect to the block server on the data port.
2. Loop
   2a. Fill a znreq_t structure by filling the appropriate fields and convert everything to network byte order.
   2b. Send the znreq_t structure to the block server.
       E.g. use the send( ) call to write the 512 byte request structure across the network.
   2c. If a write, send all the data.
       E.g. if 64 Kbytes are to be written, call send( ) one or more times until the entire 64 Kbytes have been written.
       No conversion to network byte order is done.
   2d. Read a znres_t structure (identical to a znreq_t structure) from the block server.
       Convert from network byte order to host order. E.g. Read 512 bytes by calling recv( ).
   2e. If a read command read all the data from the Block server. E.g. if 32 Kbytes are to be read, call recv( ) one or more times until the entire 32 Kbytes have been read.

Data Structure

A single network request data structure is defined. It is 512 bytes long. All fields are individually converted to network order before being sent to a remote machine. An implementation may do this by using standard functions such as htonl( ) or ntohl( ). An implementation in C follows:

```
typedef unsigned long ul_t;   /* unsigned long is 4 bytes */
#define ZNPADSZ   (512-16*sizeof(ul_t))
typedef struct znetwork_request {
        ul_t    zn_type;
        ul_t    zn_version;
        ul_t    zn_hostid;
        ul_t    zn_zlun;
        ul_t    zn_authentic;
        ul_t    zn_sequence;
        ul_t    zn_nsequence;
        ul_t    zn_op;
        ul_t    zn_flags;
        ul_t    zn_requestid;
        ul_t    zn_status;
        ul_t    zn_reqsz_hi;
        ul_t    zn_reqsz_lo;
        ul_t    zn_lba_hi;
        ul_t    zn_lba_lo;
        ul_t    zn_marker;
        char    zn_pad[ZNPADSZ];
} znreq_t, znres_t;
``` zn_type
    A type field. For now set to 1.
zn_version
    A version field. For now set to 1.
zn_hostid
    Block server assigned host identifier. For now set to 0.
zn_zlun
    Block server assigned virtual logical unit number (Lun). The Lun must correspond to an existing logical unit on a Block server.
zn_authentic
    Not yet used. Set to zero.
    Authentication token, a place holder.

zn_sequence
　Not yet used.
　I/O Sequence number for the ops.
zn_op
　Operation to perform.
　Currently 2 operations are supported: read and write.
　Opcodes:
　0x2 read
　0x3 write
　Remember that these values must be converted to network order before sending a command.
zn_flags
　The meaning of this field is different for requests and responses. For requests, this field specifies operation flags. For now a host can set this to zero. In the future a write-through flag will be supported to specify that a write be flushed to physical media before a command completes. For responses, if the zn_status field indicates a failed command, the flags field will be set with extended error information. The meaning of the error codes will be documented later. For now just report flags if they are non-zero when a response fails.
zn_requestid
　Not yet used. For now set to zero.
zn_status
　Status of operation performed. 0 indicates success.
　Non-zero indicates failure. Recall that the prototype does not specify error handling. Following a failure a host may attempt to retry the I/O.
zn_reqsz_hi
　Not yet used.
　High order 32-bits of size.
zn_reqsz_lo
　Low order 32-bits of size (in bytes).
zn_lba_hi
　Not yet used.
　High order 32-bits of logical block address (LBA).
zn_lba_lo
　Low order 32-bits of starting LBA.
zn_marker
　Not yet used.
　Just a marker to help us find things.
zn_pad[ZNPADSZ]
　Pads the structure to occupy exactly 512 bytes.

APPENDIX D

Network Storage Unit (NSU) Configuration Protocol

On the NSU, there is a configuration file called /etc/nsu-.conf Amongst other things, this file contains the data used to configure and manage the per-host unit definition and allocation functions. This file is only edited by the 3DM utility. The syntax and semantics of the "HOST" entries are given below.

```
HOST host1
    DATA_PORT   = 10.1.1.1:10002(10)
    DATA_PORT   = 10.1.2.1:10002(12)
    UNIT unit_1
       LBA   = unit0(0,25429823)
    UNIT unit_2
       LBA   = unit1(0,1000)
    UNIT unit_3
       LBA   = unit1(1001,25429823)
```

Additional explanation for above:
"host1" contains the IP address for the host-side interface that is being configured.

The DATA PORT fields represent the NSU-side IP address and port number the control processes will expect the data connections to be bound to for requests from that remote IP address.

The (10) and (12) after the port numbers represents maximum number of connections the NSU will establish on that port. This effectively limits the number of per-IP address IO operations that can be performed in parallel. Note that the storage abstraction used by the NSU maps storage onto IP addresses. Thus, hosts which change their IP addresses frequently, such as DHCP clients without long-lived address leases, will not be well served in this architecture.

The twed* field represents the local (NSU-side) unit that the remote unit will map into. (The twed nomenclature stands for 3ware Escalade Disk, which is a disk of an NSU.)

The (x,y) is an lba range the NSU allocates for that particular remote unit

The Concept:
　(1) Any client can have multiple data connections on multiple IP/port combinations.
　(2) Any client can have multiple units, where a unit is defined as an LBA range on a particular physical unit on the block server
　(3) In the current instantiation of this protocol, no NSU will be partitioned into more than 100 units.

The Protocol (all Values Will be Sent in Network Order):
　(1) (Mandatory) The host connects to the NSU configuration port (port 10001, by default). This connection must be issued from a TCP/IP "Privileged Port", with port number less than 1024. (Some operating systems refer to ports numbered less than 1024 as "Reserved Ports.")
　(2) The NSU accepts the connection request, verifies that it is coming from a port number less than 1024 (if not, the NSU closes the connection), and responds to the host by sending a message of the type znreq_t, with the opcode set to Z_GET_VERSION (0x1005), and with a bitmask of the NSU protocol versions (currently 0x01) set in the zn_version field, and with a 32-bit pseudo-random number placed in the zn_reqsz_lo field.
　(3) (Mandatory) The host receives the Z_GET_VERSION request from the NSU, and performs a logical AND operation between its own bitmask of supported version numbers and the version numbers supplied by the NSU. These version numbers are represented in a common format on the NSU and the host side. If the AND operation yields 0, then there is no matching version and the host shall close the connection and inform the local operating system of the version mismatch error. If the AND operation yields a non-zero value, then there is a match and the host may select any version supported by both it and the NSU. This value is placed in the zn_version field of the znreq_t structure that will be sent back to the NSU. In practice, we suggest the zn_version field be set to the "highest matching value" that both the host and the NSU have indicated they support. In addition, the host must calculate the 32-bit 1's complement of the pseudo-random number from the zn_reqsz_lo field of the request, and place that value into the zn_reqsz_lo field of the znreq_t return structure. All other fields in this structure are undefined. This znreq_t structure is then sent back to the NSU. (Also note that in the normal case, the pseudo-random number sent by the NSU will be used later in Step (14) of the protocol.)

(4) If the NSU does not receive a reply to the Z_GET_VERSION request it sent in step (2) within five (5) seconds, it will close the connection, and go back into its "accept" state.

(5) When the NSU receives the reply from the host within the allotted 5-second window, it checks the value in the zn_reqsz_lo field to see if it is, in fact, the 32-bit 1's compliment of the pseudo-random number it sent. It then sends a response back to the host, with the zn_status field set to 0 if the zn_reqsz_lo field contained the expected value, and to −1 if it did not. If it is not the value expected, the NSU closes the connection after sending the response message.

(6) (Optional) On success, the host may send a znreq_t with an opcode of Z_GET_STARTTIME to the NSU. All other fields in this request structure are ignored.

(7) (Optional) In response to a Z_GET_STARTTIME operation, the NSU will send back a znreq_t reply with the zn_reqsz_lo field filled in with an opaque "cookie" which represents the time the /etc/nsu.conf file was last modified. This is done so that if a client driver loses its connection to the NSU configuration channel, it can determine upon reconnecting whether or not its last known state is still valid. The actual value of the cookie field is opaque to the application. Drivers should only test old and new values of the cookie for equality or inequality. No other operation on the cookies is defined. All other fields in this reply structure are undefined.

(8) (Mandatory) The host shall send a znreq_t with an opcode of Z_GET_CAPACITIES to the NSU. All other fields in this request are ignored.

(9) In response to the Z_GET_CAPACITIES request, the NSU sends back a znreq_t reply with the zn_reqsz_lo field of the structure filled in with the number of units available to it, followed by that number of uint64_t's, which specify the capacity for each unit. These capacities are specified in BYTES. If the zn_reqsz_lo field contains 0, this means that the NSU has not been configured to provide access to any of its storage to the host from which the request was sent. All other fields in the reply structure are undefined.

(10) (Mandatory) The host sends a znreq_t with an opcode of Z_GET_DATAPORT to NSU. All other fields in this request structure are ignored.

(11) In response to a Z_GET_DATAPORT request from the host, the NSU sends back a znreq_t reply with the zn_reqsz_lo field filled in with the number of data IP/port connections it is authorized to open, followed by that number of the following structure:

All other fields in the reply structure are undefined.

(12) The NSU establishes "listen" sockets on an appropriate number of data channels, and awaits connections from the host.

(13) The host connects to as many of those sockets as it chooses, up to the maximum specified in the max_connections field of the per-host DATAPORT configuration section above. (Attempts to create additional data connections beyond max_connections will fail with "connection refused.")

(14) The host then sends znreq_t messages on each data socket with the pseudo-random number it received from the NSU in Step (2) put into the zn_reqsz_lo field of the structure. All other fields in this structure are undefined.

(15) The NSU responds to the message sent in Step (14) with a znreq_t message with the zn_status field set to 0 on success, or −1 on failure.

(16) At this point, the configuration and authentication protocols are completed, and data transfer requests from the host will be honored by the NSU.

General Implementation Notes:

(1) Each data port on the NSU box is capable of handling I/O requests for any unit (2) If the NSU ever detects that a configuration socket has been closed, it will close all data port connections associated with that host and expect the host to reconnect and re-run the configuration protocol. As such, it is important that the host side not close the configuration socket when the configuration is complete, since that is the socket which will be used to notify the host of events such as shutdowns and the addition of new units. One technique that a host can potentially use to clean up connections in confused states is to close the configuration socket. If there is network connectivity between the host and NSU, the NSU will detect the close, and will close all the data sockets associated with that configuration socket.

(3) If the NSU ever rereads the /etc/nsu.conf file (because an administrator updated the NSU configuration), it will close the configuration socket for all hosts that had their unit information changed, and will expect them to reconnect and re-run the configuration protocol to acquire the new configuration data. Thus, host drivers need to keep the connection to the NSU configuration port open, and use its closure by the NSU as a signal to re-run the configuration protocol to re-establish the unit and dataport configurations.

What is claimed is:

1. A storage server system that provides block-level storage for host computers over a computer network, the system comprising:

```
struct z_get_dataport_t {
        uint_32   ip_type;     /* 4 = ipv4, 6 = ipv6 */
        union {
                uint32_t  ipaddr;       /* result if ipv4 */
                uint32_t  ipv6addr[4];  /* ipv6 of above */
        } ip;
        uint32_t  portnum;       /* port number in network order */
        uint32_t  max_connections;  /* maximum number of data channels
*/
};
``` a storage server comprising a processor, an array of disk drives coupled to a controller, and a network interface for connecting the storage server to a computer network; and a software system which is configured to provide functionality for subdividing storage space of the array of disk drives into storage partitions, and provide functionality for uniquely allocating the storage partitions to host computers on the network such that the storage server may be shared by the host computers, and such that when a partition is allocated to a host computer, the partition appears to user-level processes of the host computer as a local disk drive, wherein the storage server is capable of processing requests received from the host computers in parallel, the software system comprises a host driver which is configured to run on the host computers and a server driver which is configured to be executed by the processor of the storage server, and the host driver and the server driver are configured to communicate over the computer network via TCP/IP connections.

2. The storage server system as in claim 1, wherein the software system further comprises a configuration and management program which is configured to run on the storage server and provide functionality for the storage partitions to be created and assigned to the host computers over the computer network using a web browser.

3. The storage server system as in claim 1, wherein the software system is further configured to provide functionality for allocating a shared partition to multiple host computers to permit sharing of the shared partition.

4. The storage server system as in claim 1, wherein the storage partitions have a user-definable size.

5. The storage server system as in claim 1, wherein the software system is configured to support the ability for the host computer to concurrently perform multiple input/operations over multiple TCP/IP connections to the storage server.

6. The storage server system as in claim 1, wherein the software system is configured to implement an authentication protocol in which the storage server authenticates the host computers using a challenge-response protocol.

7. The storage server system as in claim 1, wherein the software system is configured to implement a discovery protocol in which the storage server notifies the host computer of storage partitions assigned to the host computer.

8. The storage server system as in claim 1, wherein the storage partitions are each uniquely allocated to one of the host computers.

9. The storage server system as in claim 1, wherein at at least one of the storage partitions is allocated to multiple ones of the host computers.

10. The storage server system as in claim 1, wherein the storage server is configured to be connected with the host computers in parallel.

11. The storage server system as in claim 1, wherein the storage server is configured to be connected to at least two of the host computers via disparate networks.

12. The storage server system as in claim 1, wherein the storage server is configured to be connected to at least two of the host computers via different ones of a hub, the Internet, a router, a switch, and a gateway.

13. The storage server system as in claim 1, wherein the storage server is configured to be redundantly connected to the host computer.

14. The storage server system as in claim 13, wherein the storage server is configured to be redundantly connected to the host computer via disparate networks.

15. The storage server system as in claim 1, wherein the partition includes storage space of multiple disk drives.

16. The storage server system as in claim 1, wherein the partition appears to user-level process of the host computer as multiple disk drives.

* * * * *